United States Patent [19]
Large

[11] 4,037,854
[45] July 26, 1977

[54] FLYWHEEL AIDED BICYCLE

[76] Inventor: Eugene Large, 25-64 83rd St., Jackson Heights, N.Y. 11370

[21] Appl. No.: 622,425

[22] Filed: Oct. 15, 1975

[51] Int. Cl.² .............................................. B62M 1/10
[52] U.S. Cl. ....................................... 280/217; 180/74
[58] Field of Search ........................... 280/217; 180/74

[56] References Cited

U.S. PATENT DOCUMENTS

| 465,475 | 12/1891 | Hardy | 280/217 |
| 1,329,940 | 2/1920 | Wallace | 280/217 X |
| 3,439,926 | 4/1969 | Bayard | 180/74 X |

FOREIGN PATENT DOCUMENTS

| 166,096 | 11/1949 | Austria | 280/217 |
| 73,943 | 10/1960 | France | 180/74 |
| 32,090 | 9/1933 | Netherlands | 280/217 |

Primary Examiner—John P. Silverstrim

[57] ABSTRACT

A bicycle includes a flywheel mounted coaxially and rotatably with respect to a pedal-carrying shaft. The flywheel is drivingly coupled to the rear tractive wheel via a pair of friction wheels mounted in gear train fashion to provide a ratio of at least 1,000 revolutions of the flywheel per revolution of the tractive wheel. One of the intermediate wheels serves as a slip clutch for selective engagement with the tractive wheel. This clutch wheel has its axle mounted in an elongated slot. A bendable arcuate control lever positions the axle along the slot.

1 Claim, 3 Drawing Figures

FLYWHEEL AIDED BICYCLE

FIELD OF THE INVENTION

The present invention relates to pedal propelled vehicles which utilize a flywheel. In its particular aspects, the present invention relates to the mounting of a flywheel coaxially with a pedal carrying shaft.

BACKGROUND OF THE INVENTION

Heretofore, it has been proposed to utilize a flywheel in a bicycle for storing energy imparted to the bicycle upon going downhill for later propulation aid during uphill travel. While various bicycle designs have been proposed in the art none are conducive for use with an extremely high angular velocity flywheel. For example, the placement of the flywheel in prior designs was at relatively weak portions of the bicycle frame which also would expose the flywheel to accidental touching. Further, the prior art has not pointed out how to mechanize an appropriate slip clutch mechanism to enable selective engagement of the flywheel for propulsion aid or braking.

OBJECTS OF THE INVENTION

It is an object of the present invention to provide a flywheel aided bicycle having a high velocity flywheel mounted at the strongest part of the bicycle frame.

It is a further object of the present invention to provide a flywheel aided bicycle which has slip clutch mechanism cooperating with the periphery of the tractive wheel.

SUMMARY OF THE INVENTION

Briefly, the aforementioned and other objects of the present invention are satisfied by mounting a flywheel coaxial and rotatable with the pedal carrying shaft since the journal carrying this shaft is generally the strongest location on a bicycle frame.

For coupling the flywheel to the rear tractive wheel, I utilize a pair of wire sheels mounted in the frame in gear train fashion. One wheel, which is engageable with the circumferential periphery of the tractive wheel, has its axle carried between a pair of elongated slots directed radially of the tractive wheel. By selectively positioning the axle along the slots with a suitable control lever, the tractive wheel is selectively frictionally engaged in slip clutch fashion. Thus, the pressure exerted by hand on the control lever controls the degree of coupling between the flywheel and the tractive wheel.

A ratio of at least 1,000 revolutions of the flywheel per revolution of the tractive wheel is achieved when the slip clutch is in complete engagement.

Other objects, features and advantages of the present invention will become apparent upon perusal of the following detailed description of the preferred embodiment thereof when taken in conjunction with the appended drawing wherein:

FIG. 1 is a side elevation of a bicycle according to the principles of the present invention; and FIGS. 2 and 3 are canted cross-sectional views of FIG. 1 taken respectively aong the lines 2—2 and 3—3 therein.

DETAILED DESCRIPTION

Figure 1:
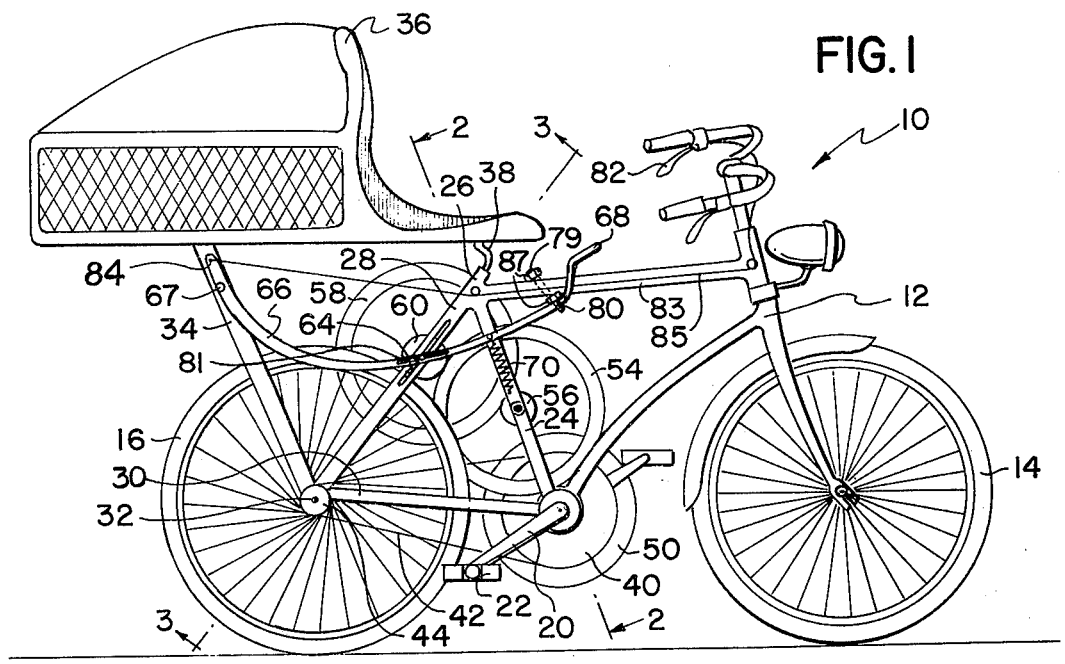
Figure 2:
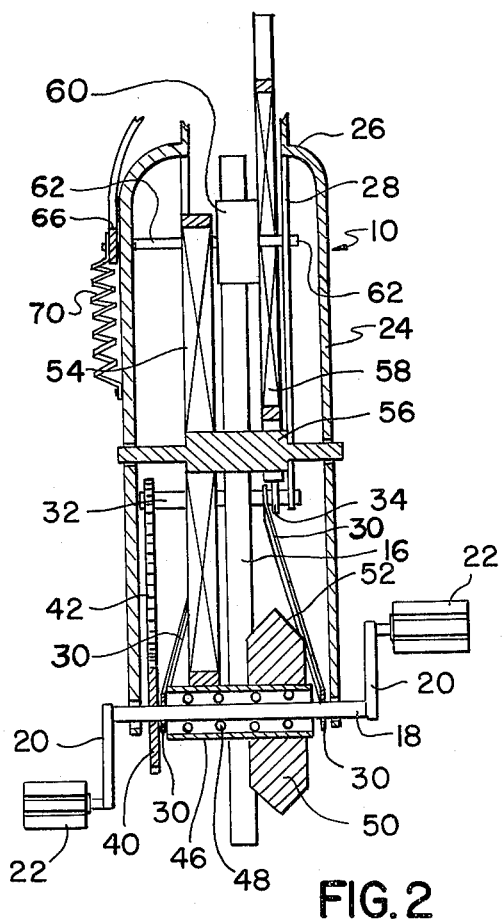
Figure 3:
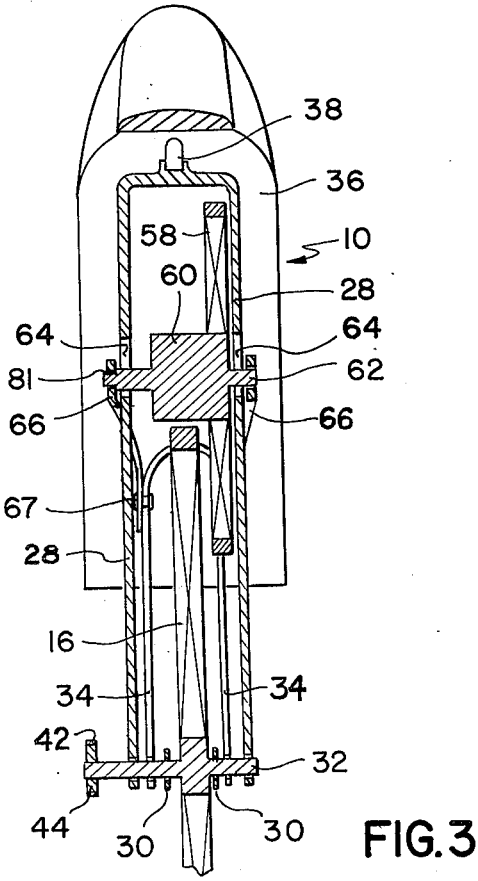

Referring to FIGS. 1 through 3 of the drawing, the flywheel aided bicycle of the present invention is generally indicated by the reference numeral 10. Bicycle 10 comprises a frame 12 in which are journalled the usual front steerable tractive wheel 14 and the rear driving tractive wheel 16. Further, between wheels 14 and 16 a shaft 18 is journalled in frame 12. Shaft 18 is terminated at its opposite ends with crank arms 20 carrying the usual pedals 22.

Pedal shaft 18 is journalled in a fork 24 which merges at its top end into a junction 26 with a narrower fork 28 in which the rear tractive wheel 16 is journalled. As is apparent from FIG. 1, the forks 24 and 28 each form a different side of an equilateral triangle portion of frame 12, which triangle portion is completed by a pair of struts 30 directed between shaft 18 and the axle 32 of wheel 16. This triangular shape imparts great strength to the central portion of frame 12.

Radiating from axle 32, in a direction parallel to fork 24 is another fork 34. An elongated seat and luggage compartment member 36 is supported on the top of fork 34 at the rear of member 36 and is supported at the front of the member on a stem 38 upstanding from the top of fork 28.

As is usual, a sprocket wheel 40 is fixedly carried on pedal shaft 18 and is linked by a chain 42 to a sprocket wheel 44 carried by rear axle 32 to permit transmission of torque from the pedals 22 to rear wheel 16.

According to the principles of the present invention a tubular sleeve 46 of preferably 1 inch in outside diameter is mounted coaxial with shaft 18 with ball bearings 48 radially between sleeve 46 and shaft 18 to permit relative rotation therebetween. A flywheel 50, of preferably 10 inch diameter, is mounted fixedly and coaxially on sleeve 46. Flywheel 50 is preferably composed of radially directed glass fibers formed in a suitable sintered binder to prevent the flywheel from flying apart at high rates of revolution due to radial centrifugal stress. Furthermore, the flywheel 50 preferably has at its periphery 52 a hyperbolically tapered thickness to provide further resistance to centrifugal stresses.

A wire wheel 54, of preferably 14 inch diameter, is journalled in fork 24 above shaft 18 and frictionally engages the outside diameter of sleeve 46 at its circumferential periphery. Wheel 54 has a preferably 2 inch diameter axially extending hub 56.

The circumference of hub 56 is frictionally engaged by the circumference of a second wire wheel 58 which is journalled in fork 28 above rear wheel 16. Wheel 58 is also preferably fourteen inches in diameter and is provided also with an axially extending integral cylindrical hub 60 of preferably 2 inches in diameter. Hub 60 is frictionally engageable with the circumference or tread of wheel 16. It should be apparent, that in view of the aforementioned preferred sizes the wheels 54 and 58, the hubs 56 and 60 and the sleeve 46, if the rear wheel 16 is at least 22 inches in diameter, the flywheel 50 and rear wheel 16 may be coupled to achieve a ratio in excess of 1,000 revolutions of flywheel 50 per revolution of rear wheel 16.

The hub 60 of wheel 58 has an integral axle 62, which passes through elongated slots 64 in opposite legs of fork 28. As is apparent from the drawing, slots 64 are directed radially with respect to rear wheel 16. The axle 62 has an elongated arcuate forked bendable lever 66 secured thereto at an intermediate position aong the length of the lever passing through longitudinal slots 81 in the lever. One end of lever 66 is secured to fork 34 at a pivot 67 while the other end of lever 66 merges into a hand grip 68 in front of seat member 36 which is adjustably carried from a brace 83 by a stud 79 passing slidably through a brace 83. Stud 79 has a slot 80 through which lever 68 passes. Slot 80 defines an angular range for the movement of lever 66 about pivot 67. The range is shifted by moving pin 79 as desired and locking it with nuts 87 above and below brace 83.

Lever 66 is normally biased by a compressed spring 70 below the lever which is secured at one end to fork 24 and at the other end to an intermediate position along the lever. This biasing action carries axle 62 upward along slot 64 sufficiently for the hub 60 to be disengaged from wheel 16. Upon pushing generally downward on hand grip 68, the force of spring 70 is overcome and the lever is rocked downward moving axle 62 downward along slot 64 sufficiently for hub 60 to contact the circumferential periphery of wheel 16.

It should be apparent that the degree of frictional engagement between hub 60 and wheel 16 is a function of the force exerted on hand grip 68. Thus, for example, with no force exerted the aforementioned members are disengaged, with moderate force a slippage engagement is possible, while at large force a complete engagement is accomplished. It should be apparent that wheel 58 froms a part of a slip clutch mechanism capable of continuous adjustment.

As an additional or alternate control mechanism, I provide a control cable 85 running between a handlebar lever 82 which is secured to the end of lever 66, at 84, to provide a moment about pivot 67, when cable 85 is pulled, for actuating the aforementioned slip clutch mechanism.

Having described the preferred embodiment of the present invention in very specific detail, it should be understood that numerous modifications, additions and omissions in the details thereof are possible with the intended spirit and scope of the invention.

What is claimed is:

1. A pedal propelled vehicle comprising a frame in which are journalled a tractive wheel and a pedal carrying shaft, first transmission means drivingly coupling said pedal carrying shaft to said tractive wheel, flywheel means mounted coaxial and rotatable with respect to said shaft, second transmission means carried by said frame for drivingly interconnecting said tractive wheel to said flywheel, said second transmission means including a slip clutch means, an elongated slot means in said frame directed radially from said tractive wheel, said slip clutch means comprising a clutch wheel forming a part of said second transmission means which is carried rotatably on an axle passing through said slot means, said clutch wheel being dimensioned to engage the circumference of said tractive wheel when said axle is positioned at a particular location along said slot means, an elongated lever pivotaly mounted at one end to said frame; said lever being rotatably secured to said axle at an intermediate position along the length of said lever for selectively positioning said axle along said slot means, spring means acting between said lever and said frame for urging said clutch wheel out of engagement with said tractive wheel; and a handgrip on the other end of said lever.

* * * * *